United States Patent
Park et al.

[11] Patent Number: 5,998,101
[45] Date of Patent: Dec. 7, 1999

[54] CINNAMATE-CONTAINING PHOTOPOLYMER FOR ORIENTATION FILM OF LIQUID CRYSTAL DISPLAY (LCD) AND METHOD OF FORMING THE ORIENTATION FILM USING THE PHOTOPOLYMER

[75] Inventors: Jae Geun Park; Do Yun Kim; Hwan Jae Choi; Joo Young Kim, all of Daejon, Rep. of Korea

[73] Assignee: Samsung Display Devices Co., Ltd., Kyungki-do, Rep. of Korea

[21] Appl. No.: 08/951,570

[22] Filed: Oct. 16, 1997

[30] Foreign Application Priority Data

Apr. 25, 1997 [KR] Rep. of Korea ............ 97-15556

[51] Int. Cl.$^6$ ............ C08F 20/10; C08F 20/22; G02F 1/1337
[52] U.S. Cl. ............ 430/321; 522/121; 522/153; 427/520; 427/553; 526/321; 526/242; 525/304
[58] Field of Search ............ 430/20, 321; 349/124, 349/123, 127, 135; 525/302, 304; 526/321, 326, 242, 245, 292.4, 292.5; 427/520, 553; 522/121, 153

[56] References Cited

U.S. PATENT DOCUMENTS

| | | | |
|---|---|---|---|
| 3,882,084 | 5/1975 | Tato et al. | 526/245 |
| 5,290,824 | 3/1994 | Mandal et al. | 522/75 |
| 5,464,669 | 11/1995 | Kang et al. | 428/1 |
| 5,539,074 | 7/1996 | Herr et al. | 526/326 |
| 5,705,096 | 1/1998 | Kano et al. | 252/299.4 |

FOREIGN PATENT DOCUMENTS

63-092609  4/1988  Japan .

OTHER PUBLICATIONS

Dyaduysha, A. et al., "Peculiarity of an Oblique Liquid Crystal Alignment Induced by a Photosensitive Orientant", *Jpn. J. Appl. Phys.*, 1995, 34(Part 2, No. 8A), L1000–L1002.

Schadt, M. et al., "Surface–Induced Parallel Alignment of Liquid Crystals by Linearly Polymerized Photopolymers", *Jpn. J. Appl. Phys.*, 1992, 31(Part 1, No. 7), 2155–2164.

*Primary Examiner*—John A. McPherson
*Attorney, Agent, or Firm*—Woodcock Washburn Kurtz Mackiewicz & Norris LLP

[57] ABSTRACT

The present invention provides novel photopolymers for use in liquid crystal display. The photopolymers are cinnamate-containing photopolymers wherein a mesogen, preferably containing a benzene ring, is introduced between a polyvinyl main chain and a cinnamate group, and also wherein the cinnamate group can be substituted with a cyanide group, an alkyl group, a halogen atom or a fluorocarbonyl group. The cinnamate-containing photopolymers have improved stability and photoelectric properties, and improved pre-tilt angle. The photopolymers can be used to form an orientation film for an LCD in a non-rubbing process, and can be used alone or with a cross linking agent.

13 Claims, No Drawings

CINNAMATE-CONTAINING PHOTOPOLYMER FOR ORIENTATION FILM OF LIQUID CRYSTAL DISPLAY (LCD) AND METHOD OF FORMING THE ORIENTATION FILM USING THE PHOTOPOLYMER

FIELD OF THE INVENTION

The present invention relates to photopolymers for use in orientation films for liquid crystal display (hereinafter "LCD"). More particularly, the present invention relates to cinnamate-containing photopolymers for use in LCD orientation films, and to methods for forming orientation films using the cinnamate-containing photopolymers.

BACKGROUND OF THE INVENTION

A liquid crystal display which can substitute for a cathode ray tube (CRT) has advantages of relatively light weight and low consumption of electricity. In particular, as a thin film transistor-liquid crystal display (TFT-LCD) operates each pixel independently, response time is relatively short and a high quality of resolution of moving images can be obtained. Accordingly, the TFT LCD has many applications, including, for example, notebook computers, wall hangings, televisions and the like.

LCDs can be in one of a number of different "modes", including twisted nematic (TN) mode, in-plane switching (IPS) mode, and vertically aligned (VA) mode. These modes differ from one another in a number of properties including the initial orientation of the liquid crystals, the structure of the thin film transistor, polarized film, operating method of liquid crystal, etc. For example, in a conventional TN mode, the liquid crystal is initially oriented so that is twisted by 90° and an electric field is formed between the upper glass electrode and the lower glass electrode. In contrast, in the IPS mode, the liquid crystal is initially oriented horizontally and an electric field is generated parallel to the layer of liquid crystal. A VA mode LCD has a relatively high contrast ratio and a wide visual angle, as compared to a TN mode LCD. The liquid crystal molecules in a VA mode LCD normally appear black due to an initial orientation vertical to the glass electrodes.

A TN mode LCD has a relatively narrow visual angle, because the liquid crystal molecules are oriented in a particular direction by an electric field. On the other hand, an IPS mode LCD has a relatively wide visual angle, because the liquid crystal molecules rotate parallel to the glass electrodes to produce a small refraction difference of the liquid crystal molecules, and because phase retardation of light passing through the LCD cell is compensated. However, when a rubbing process is applied to an IPS mode LCD, a number of problems can result. First, unwanted backlight transmission through the LCD cell can occur due to non-uniformity of liquid crystal molecules, which is in turn caused by poor orientation of the orientation film. This is referred to as a "leak phenomenon". Although leaking can be prevented in a color filter process by use of a black matrix, this can cause other problems such as, for example, a poor brightness or contrast ratio. Second, an IPS mode LCD has a poorer response time than a TN mode LCD, which is believed to be due to interaction between liquid crystal molecules and the orientation film. Thirdly, an IPS mode LCD has an image sticking which is not observed in a TN mode LCD, which is believed to be due to the structure of the cell and the interaction between liquid crystal molecules and the orientation film.

Generally, a conventional TFT LCD cell is composed of a glass substrate, a thin film transistor device, an indium tin oxide (ITO) transparent electrode and an orientation film. For a TFT LCD to operate, liquid crystal molecules should be initially oriented between the TFT LCD cells. The degree of orientation of the liquid crystal is the most important factor influencing the quality of the LCD. The degree of orientation of a liquid crystal is indicated by the "pretilt angle". The pretilt angle is a fixed angle by which liquid crystal molecules on the surface of an electrode are tilted with respect to the surface. The pretilt angle is dependent on a number of factors including composition of the liquid crystal, type of alignment layer, and rubbing strength. Generally, a TFT- LCD requires a pretilt angle of at least about 1° to 3°, and a STN-LCD (super twisted nematic—liquid crystal display) requires a pretilt angle of at least about 5°.

For orientation of a liquid crystal, an orientation film is formed from a polymeric material. The polymeric material is coated onto an ITO electrode to form an orientation film, and then the orientation film is rubbed with a rubbing cloth of nylon or rayon, in a so-called "rubbing process". Conventionally, a heat resistant polymeric material such as a polyimide is applied by a spin coating or a printing method, which can be readily carried out by a person of ordinary skill in the art, and the rubbing process follows. This conventional method of preparing the orientation film is generally applied in mass production of LCDs because the polymeric material can be easily and rapidly coated onto the ITO electrode. However, the conventional method has shortcomings, including potential damage to the thin film transistor due to static electricity generated during the rubbing process, and potential adverse effects on the orientation film due to dust or fibers from the rubbing cloth.

Accordingly, in recent years, a method of preparing a TFT LCD without using a rubbing process has been developed, called a "non-rubbing process". In the non-rubbing process, a photopolymer is used as the orientation film material. Some examples of the non rubbing process are disclosed in Jpn. J. Appl. Phys., Vol 31, 1992, 2155; U.S. Pat. No. 5,464,669 to Dae S. Kang et al.; and Jpn. J. Appl. Phys. Vol. 34, 1995, L1000. The method disclosed in the Kang patent uses a polyvinyl 4-fluorocinnamate polymer to form an orientation film. A photopolymer contains photosensitive groups which, when exposed to linearly polarized ultraviolet light, respond so that the main chains of the photopolymer are oriented, thus causing orientation of the liquid crystal molecules.

Conventional cinnamate-containing photopolymers such as polyvinylcinnamate have poor thermostability, i.e. they soften significantly at the glass transition temperature (Tg). This can destroy orientation of the polymer, thereby destroying orientation of the liquid crystal molecules. Also, because the sealing process for binding two glass electrodes in fabricating an LCD is carried out at an elevated temperature, the photopolymer used in the orientation film should be able to withstand temperatures of at least about 100° C. Furthermore, the conventional cinnamate-containing photopolymers do not provide sufficient resolution of moving images, because they do not have a sufficient pretilt angle.

In order to overcome the shortcomings of the conventional cinnamate-containing photopolymers, the present inventors have developed new cinnamate-containing photopolymers which can provide improved resolution of moving images and a wide visual angle, and which can be applied by a non rubbing process. The cinnamate-containing photopolymers can be applied to an LCD of a TN (twisted nematic) mode, an IPS (in-plane switching) mode or a VA (vertically aligned) mode.

OBJECT OF THE INVENTION

An object of this invention is to provide new cinnamate-containing photopolymers useful in forming an orientation film for an LCD in a non rubbing process.

Another object of the invention is to provide new cinnamate-containing photopolymers for forming an orientation film, which are photoelectrically stable when used in fabricating an LCD at elevated temperatures.

A further object of the invention is to provide new cinnamate-containing photopolymers which can provide an improved pretilt angle of liquid crystal molecules.

A still further object of the invention is to provide new cinnamate-containing photopolymers applicable to an LCD in a TN (twisted nematic) mode, an IPS (in plane switching) mode or a VA (vertically aligned) mode.

A still further object of the invention is to provide methods of forming an orientation film of an LCD of a TN (twisted nematic) mode, an IPS (in-plane switching) mode or a VA (vertically aligned) mode, in a non-rubbing process.

Other objects and advantages of this invention will be apparent from the ensuing disclosure and appended claims.

SUMMARY OF THE INVENTION

The cinnamate-containing photopolymers according to the present invention are compounds wherein a mesogen, preferably substituted with a benzene ring, is introduced between a polyvinyl main chain and a cinnamate group, and wherein the cinnamate group contains a cyanide group, an alkyl group, a halogen, or a fluorocarbonyl group. A "mesogen" is a rigid group in a polymer which causes the formation of a "mesophase", which is an ordered region in a liquid crystal, i.e. a region in which the liquid exhibits anisotropic behavior, becoming aligned as in a crystal structure. The introduction of a benzene-containing mesogen between a polyvinyl main chain and a cinnamate group provides improved thermostability and photoelectric characteristics. The pretilt angle is improved by the introduction of a cyanide group, an alkyl group, a halogen atom or a fluorocarbonyl group to the cinnamate group.

The cinnamate-containing photopolymers according to the present invention are useful in forming an orientation film of an LCD by a non-rubbing process. The cinnamate-containing photopolymers can be used alone or with a cross-linking agent. The combination of a cinnamate-containing photopolymer and a cross-linking agent can greatly improve the thermostability of the orientation film of an LCD. While it is not intended that the invention be bound by any particular theory, it is believed that improvement in the thermostability of the orientation film results because the cross-linking agent reacts with the cinnamate group of the photopolymer, resulting in a network-type structure.

A cinnamate-containing photopolymer, or a composition comprising a cinnamate-containing photopolymer and a cross-linking agent, according to the present invention can be applied to an LCD of a TN (twisted nematic) mode, an IPS (in-plane switching) mode or a VA (vertically aligned) mode.

DETAILED DESCRIPTION OF THE INVENTION

The cinnamate-containing photopolymers according to the present invention are compounds wherein a mesogen, preferably substituted with a benzene ring, is introduced between a main chain of polyvinyl and a cinnamate group, which cinnamate group can be substituted with a cyanide group, an alkyl group, a halogen atom or a fluorocarbonyl group.

It has been discovered that the thermostability and photoelectric characteristics of a cinnamate-containing photopolymer can be improved by introducing a mesogen comprising a benzene ring between the main polyvinyl chain and a cinnamate group. It has further been discovered that the pretilt angle can be improved by introducing a cyanide group, an alkyl group, a halogen atom or a fluorocarbonyl group to the cinnamate group.

One embodiment of the present invention is a cinnamate-containing photopolymer of the formula (I):

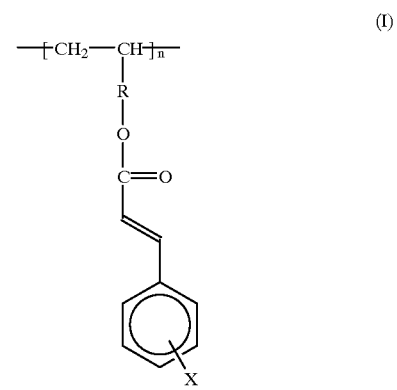

(I)

wherein:

R is a group having 1 to 3 benzene rings;

X Is —CN, an alkyl of $C_1$–$C_6$, a halogen atom or —$C_mF_{2m+1}$ wherein m is an integer of 1 to 6;

and n is an integer representing the degree of polymerization.

Another embodiment of the present invention is a cinnamate-containing photopolymer of the formula (II):

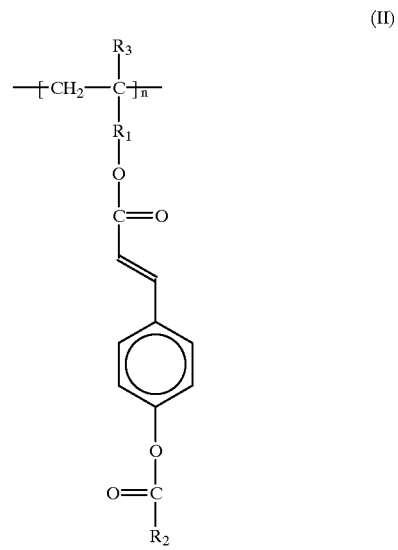

(II)

wherein $R_1$ is selected from the group consisting of:

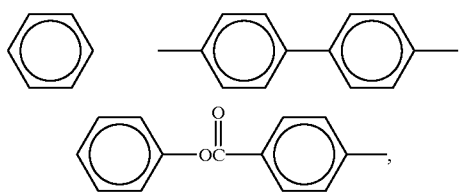

and $-(CH_2)_m-$;

$R_2$ is selected from the group consisting of:

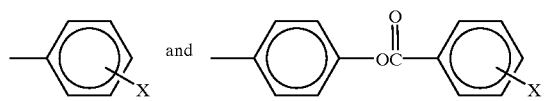

wherein X is —F, —CN, —$C_mF_{2m+1}$, or —$C_mH_{2m+1}$ wherein m is an integer of 1 to 6; and $R_3$ is H or $CH_3$, and n is an integer representing the degree of polymerization.

Another embodiment of the present invention is a cinnamate-containing photopolymer of the formula (III):

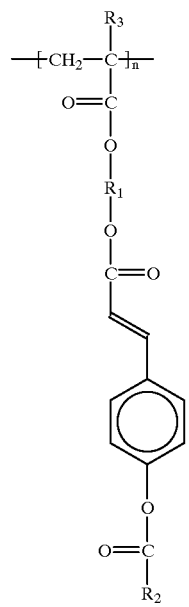

wherein $R_1$ is selected from the group consisting of:

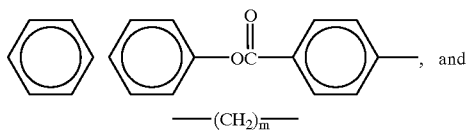

wherein m is an integer of 1 to 6, $R_2$ is selected from the group consisting of:

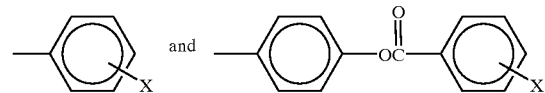

wherein X is —F, —CN, —$C_mF_{2m+1}$ or —$C_mH_{2m+1}$ wherein m is an integer of 1 to 6; $R_3$ is H or $CH_3$; and n is an integer representing the degree of polymerization.

The cinnamate-containing photopolymers of the present invention have a molecular weight of about 1,000 to 100,000, preferably about 20,000 to 30,000. "Molecular weight", as used herein, refers to the weight-average molecular weight. Generally, as the molecular weight of a photopolymer increases, the thermostability increases, but the coating ability of the photopolymer on the ITO glass electrode is reduced because solubility of the photopolymer in an organic solvent decreases. Accordingly, the molecular weight of a photopolymer is a significant factor affecting its thermostability and coating ability.

As mentioned hereinabove, the cinnamate-containing photopolymers can be used alone or with a cross-linking agent. Exemplary cross-linking agents which can be used with the cinnamate-containing photopolymer of the present invention can be represented the formula (IV):

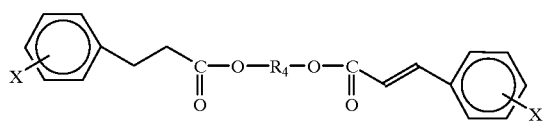

wherein X is —F, —CN, —$C_mF_{2m+1}$ or —$C_mH_{2m+1}$ wherein m is an integer of 1 to 6; and $R_4$ is selected from the group consisting of:

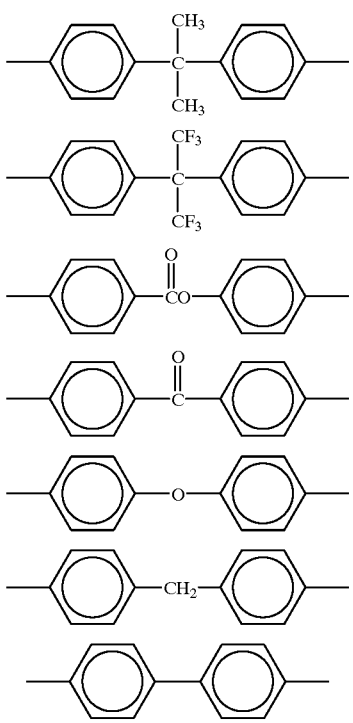

—$(CH_2)_m$— and —$(CH_2O)_m$— wherein m is an integer of 1 to 10.

The cross-linking agent can be used in an amount of from about 0.1 to about 5.0% by weight based on the total weight of the composition, i.e the total weight of the polymer, cross-linking agent, and any other optional additives and/or processing aids which might be present in the composition.

One method of forming an orientation film of an LCD according to the present invention comprises preparing a solution of a cinnamate-containing photopolymer in an organic solvent, the solution having a concentration of from about 0.5% to about 2.0% by weight and a viscosity of from about 30 to about 50 cps, coating the solution onto an ITO glass electrode to form an orientation film having a thickness of from about 500 Å to about 1,000 Å, drying the orientation film at about 140° C. for about 30 minutes, and exposing the orientation film to polarized ultraviolet light. Representative examples of organic solvents useful in the methods and compositions of the invention are chlorobenzene, N-methylpyrrolidone, dimethylsulfoxide, dimethylformamide, toluene, chloroform, γ-butyrolactone, 2-methoxy ethanol and tetrahydrofuran.

The solution of cinnamate-containing photopolymer in an organic solvent can be coated onto an ITO glass electrode by a spin coating method or a printing method, which methods are known to those skilled in the art. The coated orientation film can then be dried in a conventional drier at about 140° C. for about 30 minutes. The surface of the dried orientation film is exposed to linearly polarized ultraviolet light, using polarizer and a UV lamp.

The cinnamate-containing photopolymer according to the present invention can be applied to an LCD of a TN (twisted nematic) mode, an IPS (in plane switching) mode or a VA (vertically aligned) mode. In particular, when the cinnamate-containing photopolymer of this invention is applied to an LCD of IPS mode by a non rubbing process, an LCD having a relatively wide visual angle, with reduced reducing leaking of light and image sticking and a shortened response time can be obtained.

Conventional facilities and processes cannot generally be used for manufacture of an IPS mode LCD. However, to make a VA mode LCD, in contrast to an IPS mode LCD, it is not necessary to make modifications to conventional manufacturing facilities. The cinnamate-containing photopolymer according to the present invention can be appropriately applied to a VA mode LCD.

The following examples are merely illustrative of the present invention and should not be considered limiting of the scope of the invention in any way. These examples and equivalents thereof will become more apparent to those skilled in the art in light of the present disclosure and the accompanying claims.

EXAMPLES

Example 1

Preparation of Polyhydroxystyrenylfluorocinnamate

Fluorocinnamic acid (10 g, 0.06 mole) was dissolved in dichloromethane, and 8.59 g (0.07 mole) of thionylchloride was added dropwise to the solution. After the acid dissolved and the solution appeared clear, the reaction mixture was maintained at about 50° C. for 1 hour. The solvent and unreacted thionylchloride were removed at a reduced pressure and further the solvent was completely removed at a high vacuum pressure to give fluorocinnamoyl chloride. The fluorocinnamoyl chloride was dissolved in dried dichloromethane. A mixture of polyhydroxystyrene having a molecular weight of 22,000 and 6.07 g (0.06 mole) of triethylamine was dissolved in dichloromethane and a small amount of tetrahydrofuran. To this solution, the fluorocinnamoyl chloride solution was added dropwise while the temperature was maintained at 0° C. After keeping for 1 day, the resulting solution was washed with water to remove the solvent and amine salt. Polyhydroxystyrenylfluorocinnamate was obtained.

Preparation of LCD Cell by a Non-rubbing Process

The polyhydroxystyrenylfluorocinnamate obtained above was dissolved in chlorobenzene to a concentration of 1% by weight. The solution was coated onto a 4×4 cm ITO glass electrode by spin coating to form an orientation film. The ITO glass electrode was dried at 140° C. for 30 minutes to give a thickness of 500 Å of the orientation film. Photopolymerization was carried out on two ITO glass electrodes (upper and lower electrodes) by exposing them to polarized ultraviolet light (1 kW) for 30 minutes. The ITO glass electrodes were fabricated with an ultraviolet curable adhesive. An LCD cell was prepared by injecting a crystal liquid of MLC-6043 (a product of Merck Co. of U.S.A.). At light transmittances of 10, 50 and 90%, the applied voltage, response time, contrast ratio, visual angle, voltage holding ratio and pretilt angle of the LCD cell were measured. The test results are shown in Table 1.

Example 2

Preparation of Cross-linking Agent: Fluorodicinnamoyl Bisphenol-A

The fluorocinnamoylchloride of (10 g, 0.054 mole) of Example 1 was dissolved in chloromethane. A mixture of bisphenol A (6.16 g, 0.027 mole) and triethylamine (5.46 g, 0.054 mole) was dissolved in dichloromethane. To the solution fluorocinnamoyl chloride solution was added dropwise at 0° C. After keeping for 1 day, the resulting solution was washed with water to remove the solvent and diethylamine.

A fluorodicinnamoyl bisphenol-A was obtained.

Preparation of Composition of Photopolymer and Cross-linking Agent

A composition comprising a photopolymer and a cross-linking agent was prepared, using the polyhydroxystyrenylfluorocinnamate of Example 1 as the photopolymer and the fluorodicinnamoyl bisphenol-A as the cross linking agent. The cross-linking agent was 1% by weight of the total composition.

Preparation of LCD Cell by a Non Rubbing Process

A LCD cell was prepared as in Example 1. The test results are shown in Table

Comparative Example 1

Preparation of LCD Cell by a Rubbing Process

A photopolymer for rubbing process, polyimide (concentration 3%: JSR AL-3046: a product of Japan Synthetic Rubber Co.), was coated on ITO glass electrodes to form an orientation film having a thickness of 800 Å. The orientation film was rubbed with a rubbing roll at 1000 rpm. LCD cells were prepared in the same manner as Example 1. At light transmittances of 10, 50 and 90%, the applied voltage, response time, contrast ratio, visual angle, voltage holding ratio and pretilt angle of the LCD cell were measured. The results are shown in Table 1.

TABLE 1

| | | Example 1 | Example 2 | Comparative Example 1 |
|---|---|---|---|---|
| voltage (V)/ | $V_{90\%}$ | 1.29 | 1.30 | 1.6–1.7 |
| transmittance | $V_{50\%}$ | 1.74 | 1.70 | 2.1–2.2 |
| (%) | $V_{10\%}$ | 2/44 | 2/34 | 2.8–2.9 |
| response time | $T_{on}*$ | 8.0 | 8.2 | 9–10 |
| (msec) | $T_{off}*$ | 16.0 | 15.6 | 23 |
| contrast ratio | | 200–250 | 200–230 | 500–1000 |
| visual angle | ±X | 55–60 | 60 | 50 |
| (*) | −Y | 60 | 60 | 55 |
| | +Y | 31 | 30 | 20–25 |
| voltage holding ratio (%) | | >95 | >95 | 95 |
| pretilt | 20° C. | 4.5 | 4.5 | 3–4 |

TABLE 1-continued

| | | Example 1 | Example 2 | Comparative Example 1 |
|---|---|---|---|---|
| angle (°) | 60° C. | 3 | 4 | 2–3 |
| | 140° C. | 2 | 3 | 1 | notes:
*$T_{on}$: a rising time of liquid crystal molecules when a voltage is applied.
**$T_{off}$: a returning time of liquid crystal molecules when a voltage is off.

As shown in Table 1, the orientation films of Examples 1 and 2 are superior to the orientation film of Comparative Example 1 in voltage/transmittance, response time, contrast ratio, visual angle, voltage holding ratio and pretilt angle.

Test Methods

Voltage (V)/transmittance (%) and Contrast Ratio were measured using LCD-5000. Voltage Holding Ratio was measured using VHR. Pretilt Angle was measured using TBA.

Example 3
Synthesis of Mesogen-1 (Para-fluorobenzoylcinnamoylchloride) having a Cinnamate Group To 100 ml of an aqueous solution of 0.2 mole (8 g) of sodium hydroxide and 100 ml of dimethylsufoxide was added 0.1 mole (16.42 g) of para-hydroxycinnamic acid. The resulting solution was maintained at 0° C. and 0.1 mole (15.86 g) of para-fluorobenzoylchloride was added dropwise. The solution was strongly agitated. After further reaction for two hours, the solution was neutralized with hydrochloric acid to a pH of 6 to 7. The solution was filtered and the solid intermediate was obtained. The intermediate was washed with water and dried under vacuum. The intermediate was recrystallized in ethanol to give parafluorobenzoyloxycinnamic acid in a yield of 90%. To the para fluorobenzoyloxycinnamic acid were 1.2 equivalents of thionylchloride and 50 ml of methylene chloride added. The resulting solution was reacted at room temperature until a clear solution was obtained. After reaction, the solvent and thionylchloride were removed in a vacuum condition and dried to give para-fluorobenzoylcinnamoylchloride (mesogen-1).

Synthesis of Photopolymer 1 having a Cinnamate Group

Polyhydroxystyrene having a molecular weight of 22,000 was dissolved tetrahydrofuran having 1 equivalent of a hydroxy group, and 1 equivalent of triethylamine was added to the solution. To the resulting solution was added dropwise 1 equivalent of the para-fluorobenzoylcinnamoylchloride prepared above, dissolved in methylenechloride. After reaction for 24 hours, the resulting solution added dropwise to methanol to obtain a precipitate. The solution was filtered, and the precipitate was washed with water and methanol and dried under vacuum. Polyhydroxystyrenyl parafluorobenzoyloxycinnamate (photopolymer-1) was obtained.

Preparation of LCD Cell by a Non-rubbing Process

The photopolymer 1 obtained above was dissolved in para-chlorobenzene to be a concentration of 1% by weight. The solution was coated on a 4×4 cm ITO glass electrode by spin coating, to form an orientation film. The ITO glass electrode was dried at 140° C. for 30 minutes to form an orientation film having a thickness of 500 Å. Photopolymerization was carried out on two ITO glass electrodes (upper and lower electrodes) by exposing them at an angle of 45° to polarized ultraviolet lights of 100 W for 15 minutes. The ITO glass electrodes were fabricated with an ultraviolet curable adhesive. A LCD cell was prepared by injecting a crystal liquid of MLC 6043 (Merck Co., U.S.A.) at isotropic temperature. At light transmittances of 10, 50 and 90%, the applied voltage, response time, contrast ratio, visual angle, voltage holding ratio and pretilt angle of the LCD cell were measured. The test results are shown in Table 2.

Example 4
Synthesis of Mesogen 2 having a Cinnamate Group

One mole of 2-hydroxyethyl methacrylate was dissolved in 100 ml of methylene chloride and 1 mole of triethylamine was added. 1 mole of para-fluorobenzoylcinnamoylchloride prepared according to Example 3 was dissolved in 10 ml of methylene chloride at 0° C. and was added dropwise. After reaction at room temperature for 1 hour, 200 ml of diethylether was added, and the resulting solution was washed with a dilute hydrochloric acid solution. The diethylether was removed under vacuum to give a solid product. The solid product was recrystallized in hexane to give crystalline para-fluorobenzoylcinnamoylethyleneoxymethylmethacrylate ("mesogen-2").

Synthesis of Photopolymer 2 having a Cinnamate Group

Mesogen-2 prepared above (4 g 0.00905 mole) was dissolved 13 g of benzene, and azobisisobutyronitrile of 0.007 g (0.5 mole %) was added. The resulting solution was iced in dry ice, and was placed under high vacuum to remove dissolved oxygen. The solution was polymerized in a nitrogen atmosphere of nitrogen for 20 hours. The solution was added dropwise to methanol to precipitate the polymer. The precipitated polymer was pulverized with a mixer. After filtering, the powder was washed with methanol to give polymethacryloylethyleneoxy parafluorobenzoyloxycinnamate (photopolymer-2). The photopolymer 2 has a nematic phase.

Preparation of LCD Cell by a Non-rubbing Process

A LCD cell was prepared as in Example 3. The test results are shown in Table 2.

Comparative Example 2
Preparation of LCD Cell by a Rubbing Process

A photopolymer for use in a rubbing process, polyimide (concentration 3%: JSR AL 3046: a product of Japan Synthetic Rubber Co.), was coated onto ITO glass electrodes to form an orientation film having a thickness of 800 Å. The orientation film was rubbed with a rubbing roll in 1000 rpm. A LCD cell was prepared in the same manner as in Example 3. At light transmittances of 10, 50 and 90%, the applied voltage, response time, contrast ratio, visual angle, voltage holding ratio and pretilt angle of the LCD cell were measured. The results are shown in Table 2.

Comparative Example 3
Preparation of Polyhydroxystyrenylfluorocinnamate and LCD Cell Fluorocinnamoylchloride (0.1 mole, 15.86 g) was dissolved 100 ml of methylene chloride. Polyhydroxystyrene having a molecular weight of 22,000 was dissolved in tetrahydrofuran and 0.1 mole of triethylamine was added. To the resulting solution the chloride solution was added dropwise to give a precipitate. The precipitate was filtered, washed with methanol and dried in a vacuum to give polyhydroxystyrenylfluorocinnamate. A LCD cell was prepared in the same manner as in Example 3. At light transmittances of 10, 50 and 90%, the applied voltage, response time, contrast ratio, visual angle, voltage holding ratio and pretilt angle of the LCD cell were measured. The results are shown in Table 2.

TABLE 2

| | | Example 3 | Example 4 | Comparative Example 2 | Comparative Example 3 |
|---|---|---|---|---|---|
| Voltage (V)/transmittance (%) | $V_{90\%}$ | 1.20 | 1.30 | 1.6–1.7 | 1.29 |
| | $V_{50\%}$ | 1.60 | 1.90 | 2.1–2.2 | 1.74 |
| | $V_{10\%}$ | 2.30 | 2.52 | 2.8–2.9 | 2.44 |

TABLE 2-continued

|  |  | Example 3 | Example 4 | Comparative Example 2 | Comparative Example 3 |
|---|---|---|---|---|---|
| Response time (msec) | $T_{on}$* | 9.0 | 10.0 | 9–10 | 8.0 |
|  | $T_{off}$* | 30.1 | 17.5 | 23 | 16.0 |
| contrast ratio |  | 940 | 900 | 500–1000 | 250 |
| Visual angle (°) | ±X | 55–60° | 50° | 50° | 55–60° |
|  | −Y | 60° | 60° | 55° | 60° |
|  | +Y | 31° | 30° | 20–25° | 31° |
| Voltage holding ratio (%) |  | 74 | 80 | >>95 | 74 |
| pretilt angle (°) | 20° C. | 5° | 10° | 3–4° | 1–5° |
|  | 60° C. | 3° | 5° | 2–3° | 1–2° |
|  | 140° C. | 1° | 2–3° | <<1° | <<1° | notes:
*$T_{on}$: rising time of liquid crystal molecules when a voltage is applied.
*$T_{off}$: returning time of liquid crystal molecules when a voltage is off.

Test methods used were the same as above.

As shown in Table 2, the orientation films of Examples 3 and 4 are superior to the orientation film of Comparative Examples 2 and 3 in voltage/transmittance, response time, contrast ratio, visual angle, voltage holding ratio and pretilt angle.

Further modifications of the invention will be apparent to those skilled in the art and all such modifications are deemed to be with the scope of the invention as defined in the following claims.

What is claimed is:

1. A cinnamate-containing photopolymer for orientation films of a liquid crystal display, having the formula:

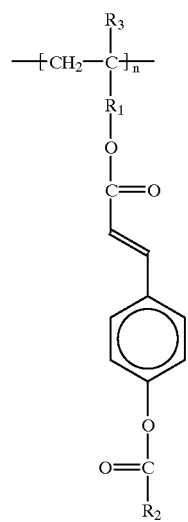

wherein $R_1$, is selected from the group consisting of:

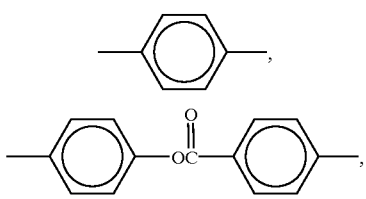

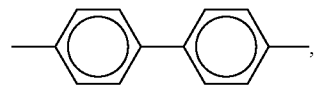

and $-(CH_2)_m-$;

$R_2$ is selected from the group consisting of:

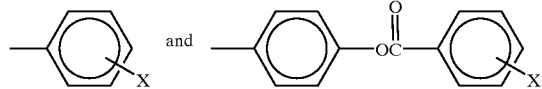

wherein X is selected from group consisting of —F, —CN, —$C_mF_{2m+1}$, and —$C_mH_{2m+1}$ wherein m is an integer of 1 to 6; and $R_3$ is H or $CH_3$; and n is an integer representing the degree of polymerization.

2. A composition for an orientation film of a liquid crystal display, which comprises:

(1) about 95 to 99.9% by weight of a cinnamate-containing photopolymer of claim 1, and (2) about 0.1 to 5% by weight of a cross-linking agent of the formula:

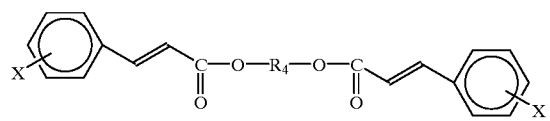

(IV)

wherein X is —F, —CN, —$C_mF_{2m+1}$ or —$C_mH_{2m+1}$, wherein m is an integer of 1 to 6, and $R_4$ is selected from the group consisting of:

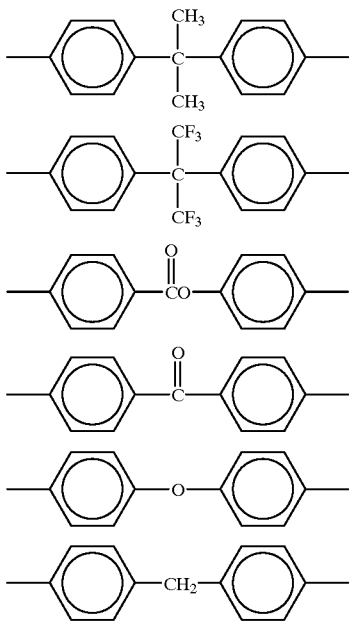

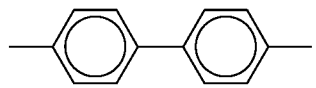

—$(CH_2)_m$— and —$(CH_2O)_m$— wherein m is an integer of 1 to 10.

3. A method of forming an orientation film of a liquid crystal display, which comprises applying the photopolymer composition of claim 2 to a TN mode display.

4. A method of forming an orientation film of a liquid crystal display, which comprises applying the photopolymer composition of claim 2 to a IPS mode display.

5. A method of forming an orientation film of a liquid crystal display, which comprises applying the photopolymer composition of claim 2 to a VA mode display.

6. A method of forming an orientation film of a liquid crystal display comprising:

preparing a solution of cinnamate-containing photopolymer composition according to claim 2 in an organic solvent, having a concentration of from about 0.5 to about 2.0% by weight and a viscosity of from about 30 to about 50 cps;

coating said solution on an ITO glass electrode to form an orientation film having a thickness of from about 500 to about 1,000 Å;

drying said orientation film at about 140° C. for about 30 minutes; and exposing said orientation film to polarized ultraviolet light.

7. A method according to claim 6 wherein said organic solvent is selected from the group consisting of chlorobenzene, N-methylpyrrolidone, dimethylsulfoxide, dimethylformamide, toluene, chloroform, γ-butyrolactone, 2-methoxy ethanol and tetrahydrofuran.

8. A method of forming an orientation film of a liquid crystal display, which comprises applying the photopolymer of claim 1 to a TN mode display.

9. A method of forming an orientation film of a liquid crystal display, which comprises applying the photopolymer of claim 1 to a IPS mode display.

10. A method of forming an orientation film of a liquid crystal display, which comprises applying the photopolymer of claim 1 to a VA mode display.

11. A method of forming an orientation film of a liquid crystal display comprising:

preparing a solution of cinnamate-containing photopolymer according to claim 1 in an organic solvent, having a concentration of from about 0.5 to about 2.0% by weight and a viscosity of from about 30 to 50 cps;

coating said solution on an ITO electrode to form an orientation film having a thickness of from about 500 to about 1,000 Å;

drying said orientation film at about 140° C. for about 30 minutes; and exposing said orientation film to polarized ultraviolet light.

12. A method according to claim 11 wherein said organic solvent is selected from the group consisting of chlorobenzene, N-methylpyrrolidone, dimethylsulfoxide, dimethylformamide, toluene, chloroform, γ-butyrolactone, 2-methoxy ethanol and tetrahydrofuran.

13. A composition for an orientation film of a liquid crystal display, which comprises:

(1) about 95 to 99.9% by weight of a cinnamate-containing photopolymer for orientation films of a liquid crystal display having the formula:

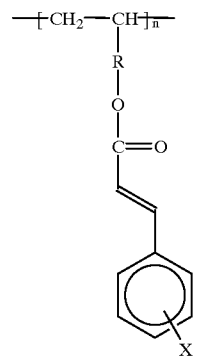

wherein R is a group having 1 to 3 benzene rings, X is selected from the group consisting of —CN, alkyl groups of $C_1$–$C_6$, halogen atoms, and —$C_mF_{2m+1}$ wherein m is an integer of 1 to 6, and n is the degree of polymerization; and (2) about 0.1 to 5% by weight of a cross-linking agent of the formula:

(IV)

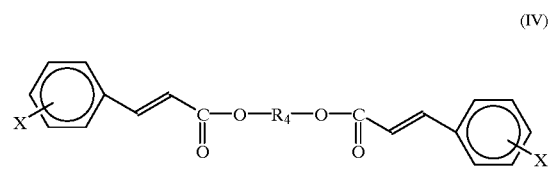

wherein X is —F, —CN, —$C_mF_{2m+1}$ or —$C_mH_{2m+1}$, wherein m is an integer of 1 to 6, and $R_4$ is selected from the group consisting of:

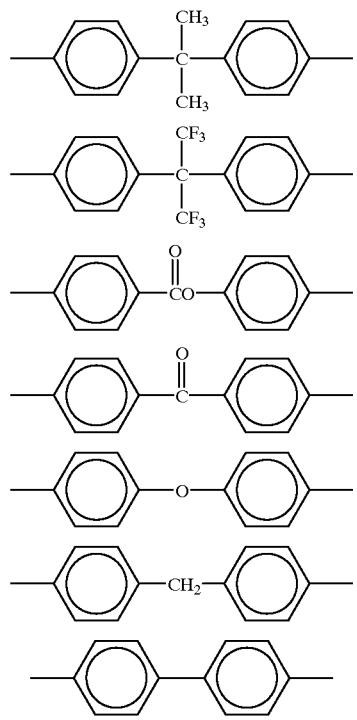

—$(CH_2)_m$— and —$(CH_2O)_m$—, wherein m is an integer of 1 to 10.

* * * * *